July 27, 1943.  L. S. WERTZ  2,325,087
METHOD OF AND APPARATUS FOR TREATING SURFACES
Filed Sept. 1, 1942

INVENTOR
Louis S. Wertz
BY Evans + McCoy
ATTORNEYS

Patented July 27, 1943

2,325,087

UNITED STATES PATENT OFFICE 2,325,087

METHOD OF AND APPARATUS FOR TREATING SURFACES

Louis S. Wertz, Cleveland Heights, Ohio

Application September 1, 1942, Serial No. 456,863

11 Claims. (Cl. 72—127)

This invention relates to a method and apparatus for treating surfaces. It particularly relates to the treatment of porous surfaces, such as concrete, masonry and similar materials, to cause densification of the surfaces and pores of the structure a substantial distance inwardly from said surface.

When an aqueous cement slurry is impacted on a porous surface, such as the surface of concrete, there is a marked tendency for the solid cementitious ingredients to separate from the water and form a layer of solids over the surfaces of the structure with only the water or liquid penetrating into the surface of the structure. Upon hardening of the cement the added layer almost invariably separates or peels off from the structure.

It is an object of the present invention to provide a process and apparatus for the treatment of surfaces of porous concrete structures and the like by which an aqueous cementitious slurry or a waterproofing material containing solid ingredients is forced into the pores and crevices of the concrete structures rather than being disposed as a layer on the surface of the structures.

It is another object of the present invention to provide a tool for the treatment of concrete and other surfaces which does not require great force on the part of the operator to maintain the device in place or to cause penetration of the ingredients into the structure.

Other objects will be apparent from the following detailed description of the invention as illustrated by the accompanying drawing, in which.

Figure 1:
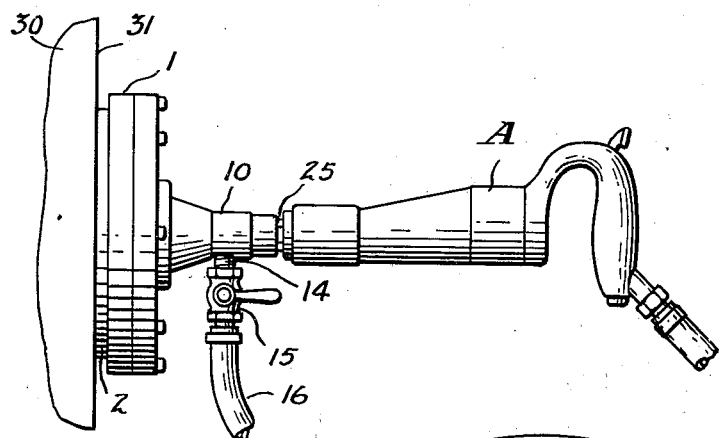
Figure 1 is an elevational view of apparatus embodying the present invention and of a portion of concrete structure illustrating the apparatus in operating position against the surface of the structure.
Figure 2:
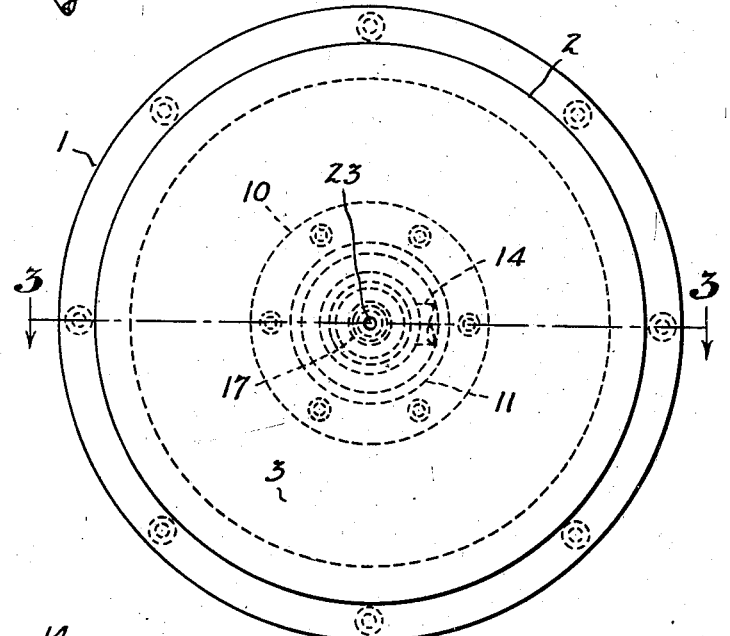
Fig. 2 is a bottom plan view of the apparatus of Fig. 1.
Figure 3:
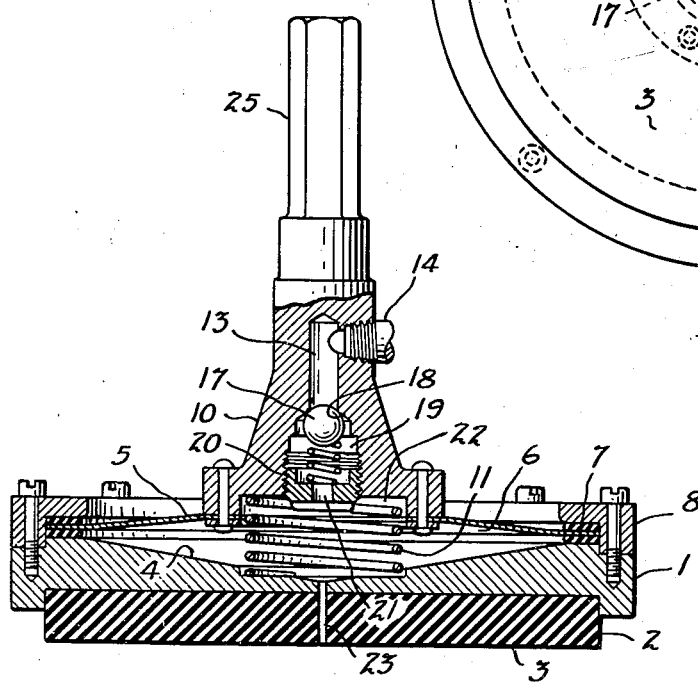
Fig. 3 is a sectional view on the line 3—3 of Fig. 2 of a portion of the apparatus of Fig. 1.

In my prior application Serial No. 309,799, filed December 18, 1939, now Patent 2,313,108, I disclosed a device for treating concrete surfaces and the like having a resilient, relatively flat face with a passageway for waterproofing or treating material centrally thereof. The flat surface is placed in contact with the surfaces of the structure and given hammerlike impacts which cause penetration of the cementitious slurry through the passageway into the surfaces of the structure. While this device disclosed in my above-mentioned application produces a very desirable result, when the flow of cementitious material is properly regulated with respect to the porosity of the structure there is sometimes a tendency to provide too great a flow of material or inability to reduce the amount of the flow sufficiently. When this occurs, there is more tendency for the formation of a layer on the surface of the structure which does not adhere well. In the present invention this difficulty is overcome by making the sealing pressure or contact pressure against the surface of the structure a function of the pressure on the treating material flowing to the surface of the structure.

In addition to the steps of presenting a member having a depressible contact face to the surface of the structure, feeding a solidifying and weatherproofing material through the face to the surface of the structure, and imparting a multiplicity of forcible or hammerlike impacts to the member in contact with the surface of the structure, as set forth in my above-mentioned application, the process of the present invention involves automatically controlling the feed of the treating material to the surface of the structure, so that if there are portions of the surface having greater porosity, the feed will also tend to increase. There is, therefore, less tendency for the accumulation of too large an amount of cementitious slurry between the depressible face of the apparatus and the structure. Consequently, there is less tendency for separation of the solid ingredients from the liquid.

The regulation and flow of the readily flowable, liquid-like treating material is accomplished herein by transmitting a multiplicity of hammerlike or forcible impacts substantially entirely through the material to the depressible contact face of the tool. The material is caused by the same impacts to flow through a passageway through the depressible face into contact with the surface of the structure. The transmission of the forces through the treating material may be effected by impacting a movable plunger or flexible wall of a chamber of variable volume containing the material in contact with the wall and passageway connecting the chamber with the outer contacting surface of the depressible portion of the tool. By transmitting the hammerlike pressure to the contact face through the flowable repair material, the pressure over the contact face is proportional to or identical with the pressure on the flowable material, so that there is less tendency for sidewise flow of the waterproofing material and there is a greater tendency for migration into the surface of the structure.

Referring more particularly to the drawing, in which like parts are indicated by like numerals of reference throughout the several views, the apparatus of the present invention may comprise two spaced walls connected by peripheral portions to define a chamber. One wall which may be the body 1 carries a resilient member 2 with a depressible contact face 3 that is adapted to bear against the surface of the porous structure or other surface to be treated. The other of said spaced walls which may be a plunger or diaphragm 5, is generally movable relative to said body 1 so that the chamber 6 is of variable volume. The volume of the cavity or chamber 6 depends on the relative position of the diaphragm or movable wall 5 with respect to the upper surface 4 of the body. Sealing means, such as gaskets 7, which are positioned around the periphery of the diaphragm 5 and which cooperate with a clamping ring 8, that is suitably attached or bolted to the body 1, are provided to effect a fluid seal between the body 1 and the diaphragm 5, so that waterproofing or flowable cementitious material does not leak from the cavity 6 along the side edges thereof.

A pressure impact transmitter 10 is suitably attached to the movable wall member shown as diaphragm 5 and serves as means for transmitting to the diaphragm 5 impulses or forcible hammerlike impacts from the impact-producing means, which may be an automatic hammer such as a conventional air or electric hammer A. Resilient means such as a spring 11 is provided for supplying a force in opposition to those of said impact-producing means so as to maintain the diaphragm or the upper movable member and the upper surface 4 of the body member 1 in spaced relation. The spring 11 causes the cavity 6 to tend to return to original volume after each impact.

A supply passageway 13 is provided for ingress of the treating or waterproofing composition from a pipe 14 to the cavity or chamber 6. The passage 13 is preferably disposed within the pressure member 10 so that its exit port 21 to the chamber is disposed within the central opening 22 of the diaphragm or plunger 5. The pipe 14 is connected through a suitable shut-off valve 15 and hose 16 to a suitable supply of treating material (not shown). Check means such as a check valve with a ball 17, which is normally held against a seat 18 by a spring 19, is provided for preventing reverse flow of the treating composition from the chamber 6 through the passage 13 when the pressure within the chamber 6 is greater than the pressure within the pipe 14. Means such as an annular adjusting nut 20 which bears against a spring 19 is provided for varying the pressure of the ball 17 against the seat 18. A passageway 23 is provided for flow of the treating composition from the chamber 6 to the contact face 3 of the resilient element 2. The cross sectional area of the passageway 23 is preferably relatively small compared to the area of the contact face 3, and the cross sectional area of the chamber parallel to said face.

The diameter of the passageway 23 may be varied substantially without changing the operation of the device. It is preferred, however, to have the cross sectional opening of the passageway 23 sufficiently small so that the cavity 6 will not tend to empty when the surface 3 is removed from the structure.

In the operation of the device the treating material, which is supplied to the hose 16 under sufficient head to cause normal flow, passes through the pipe 14 and the intake passageway 13, displaces the ball 17 from its seat 18 of the check valve, and enters the chamber 6 in sufficient amount to fill the same. The device is placed against the surface 31 of the structure 30 which it is desired to densify so that the flat contact face 3 bears against the surface 31. A multiplicity of impacts is then applied to the shank 25 of the device by operation of the hammer A. The impacts which are transmitted through the pressure member 10 to the diaphragm piston or plunger 5 cause substantial periodic movements of the diaphragm against the force of the spring 11. Periodic movement of the diaphragm 5 causes substantial periodic increases and decreases in pressure in the waterproofing material within the cavity 6.

The variations in pressure function to cause the treating material to flow intermittently through the passageway 23 in contact with the surface 31 of the structure. Increases in pressure on the material within the chamber 6, in accordance with Pascal's law causes increased force over each unit of the surface 4 and therefore increased pressure proportionately between the surface 3 of the tool and the outer surface 31 of the structure, with the result that a movement of the body 1 takes place and the resilient portion 2 is accordingly compressed.

It will be seen that an increase in pressure on the material within the chamber 6 causes an increase in pressure on the surface 3 in the same time that it causes an increase in pressure on the material within the passageway 23. This maintains sealing pressure proportional to fluid pressure and permits a more effective seal around the passageway 23 with the result that the flow through the passageway 23 is determined to a large measure by the character of the surface of the porous structure. After each impact on the shank 25, the pressure member and diaphragm 5 is moved upwardly by the spring 11 so that pressure on the material within the chamber 6 is reduced below normal, and a small additional amount of waterproofing material is permitted to flow through the passageway and check valve into the chamber 6. The multiplicity of impacts on the film of treating material subjects the film to momentary high pressures which force the treating material into the voids or pores. Continuation of the impacting forces liquid of the treating material further into the material adjacent the surface, leaving the voids nearer the surface filled with solids and substantially inert or non-volatile materials. By moving the apparatus over the entire surface while maintaining the feed of treating material and continuing the impacting, the voids and porosities of the surface may be filled and the surface rendered impervious and weather resistant to a high degree.

The treating material used may be varied depending on the nature of the surface and the conditions to which it is to be exposed. For example, in the treatment of concrete surfaces on concrete structures such as walls, bridges, dams, etc., it is often desirable to use a material having some strength in itself. An example of such a material comprises Portland cement; a filler, which may have hydraulic properties in itself and preferably contains acidic colloidal silica, to retard the gelation of the cement. Examples of such fillers are the pozzolanas, blast furnace slag, fly ash, and other natural or artificial silicious materials, etc.; a plasticizing or lubricating agent, such as oleaginous materials, including fatty acid glycerides, fatty acids, or salts and esters thereof, as well as stabilizing agents and wetting agents, examples of which are alginates, casein, bentonites, gum tragacanth and alkylated sulphonated aromatic compounds or salts thereof; and the proper amount of water to obtain the desired consistency. It is desirable that the amount of water used be only great enough to obtain a mix which may be flowed onto the surface so that the drying time of the material will be a minimum. Such a material as described above is very advantageous because the particles of the dry ingredients are held in a stable suspension so that they may be forced through hose lines without separation and high frictional losses and will penetrate into small voids and interstices. Further, the hydration of the cement is delayed until the material has been impacted into the surface and a considerable amount of the water has been forced out. Thus the water-to-cement ratio is low and the strength of the treating material when set is relatively great.

Where strength of the treating material is not required and relatively high water repellent characteristics are desired, a composition which has been found very advantageous comprises a binding material such as a pitch or bitumen, together with a drying oil, preferably one which is difficultly saponifiable; an inert filler including pulverized clays, fuller's earth, pulverized limestone, and the like; and a compatible thinner such as turpentine, heavy benzine, mineral spirits, etc. This composition has the property of rendering the treated surface highly repellent to water and thus is very advantageous in treating surfaces to prevent water gaining access to the interior of a structure where it may cause disintegration.

It is to be understood that variations and modifications of the steps of the process and the specific device herein shown and described for purposes of illustration may be made without departing from the spirit of the invention.

What I claim is:

1. The method of treating concrete and masonry structures and the like to densify them in the region of their surfaces, which comprises presenting a member having a resilient depressible face against the surface of the structure, feeding a highly flowable material containing Portland cement, through said face into contact with the surface of said structure, repeatedly and suddenly impacting said flowable material to cause periodic variations of pressure therein, and transmitting said impacts substantially entirely through said flowable material to said resilient depressible face of said member and to the surface of the structure being treated, whereby the pressure of said resilient depressible face against said structure varies as a function of the instantaneous pressure of said flowable material.

2. The method of treating porous structures to densify them in the region of their surfaces, which comprises presenting a member having a substantially flat, resilient, deformable face against the surface of a structure, disposing a readily flowable treating material in a cavity of variable volume, periodically impacting the material in the chamber to cause variations in pressure therein, feeding the material from said chamber to said deformable face, and transmitting pressures through the contents of said chamber to cause impaction of said resilient deformable face against the surface of the structure, whereby the pressure of said face against said wall is a function of pressure on the readily flowable material contained within the chamber and being supplied to said face.

3. The method of treating porous structures to densify them in the region of their surfaces, which comprises presenting a member having a substantially flat, resilient, deformable face against the surface of a structure, disposing a readily flowable treating material in a cavity of variable volume with opposing walls movable relative to each other, feeding the material from the chamber to said deformable face, and subjecting one of said movable walls to a multiplicity of hammerlike impacts to cause variation in the flow of the treating material to the surface of said structure and to cause simultaneous variations in pressure of said deformable face against the surface of the structure being treated, whereby the pressure of said deformable face against said surface is a function of the pressure on said flowable material being supplied from said chamber.

4. The method of treating porous structures to densify them in the region of their surfaces, which comprises presenting a member having a substantially flat, resilient, deformable face against the surface of a structure, disposing a readily flowable treating composition consisting of a finely divided hydraulic cement, water, a finely divided filler containing a substantial amount of acidic colloidal silica to retard gelation of the cement, and a lubricating agent, which consists in part of a fatty acid derivative, in a cavity of variable volume, periodically impacting the material in the chamber to cause variations in pressure therein, feeding the material from said chamber to said deformable face, and transmitting pressures through the contents of said chamber to cause impaction of said resilient deformable face against the surface of the structure, whereby the pressure of said face against said wall is a function of pressure on the readily flowable material contained within the chamber and being supplied to said face.

5. The method of treating porous structures to densify them in the region of their surfaces, which comprises presenting a member having a substantially flat, resilient, deformable face against the surface of a structure, disposing a readily flowable treating composition consisting of Portland cement, a finely divided filler, a lubricating agent and water in a cavity of variable volume, periodically impacting the material in the chamber to cause variations in pressure therein, feeding the material from said chamber to said deformable face, and transmitting pressures through the contents of said chamber to cause impaction of said resilient deformable face against the surface of the structure, whereby the pressure of said face against said wall is a function of pressure on the readily flowable material contained within the chamber and being supplied to said face.

6. A device for treating the surfaces of masonry and concrete structures and the like, which comprises two spaced walls connected by peripheral portions to define a chamber, one wall being movable relative to the other, a relatively flat, resilient face carried by one of said walls, impact transmitting means carried by the other of said walls, a passageway through said resilient face and its supporting wall for the passage of fluid from said chamber, means for supplying a readily flowable treating material to said chamber, and means for suddenly and periodically applying pressures to said transmitting means to periodically increase and decrease the pressure on the treating material in said chamber and to transmit through said material similar periodic forces over said resilient face when said face is disposed against the surface to be treated.

7. A device for treating concrete and masonry structures and the like to densify them in the region of their surfaces, which comprises a body portion and a diaphragm connected by peripheral portions to define a chamber of variable volume, said diaphragm being movable relative to said body portion, said body portion carrying a relatively flat, resilient member with a depressible contact face to be placed against the surface to be treated, a passageway through said body portion and said face to said chamber for the passage of fluid from said chamber, means for supplying readily flowable treating fluid to said chamber, and means for suddenly and periodically applying pressures to said diaphragm to periodically increase and decrease the pressures on the treating material in said chamber and to transmit through said treating material similar periodic forces over said resilient face when said face is disposed against the surface to be treated.

8. A device for treating concrete and masonry structures and tne like to densify them in the region of their surfaces, which comprises a body portion and a diaphragm connected by peripheral portions to define a chamber of variable volume, said diaphragm being movable relative to said body portion and carrying an impact transmitter, said body portion carrying a relatively flat, resilient member with a depressible contact face to be placed against the surface to be treated, a passageway through said body portion and said face to said chamber for the passage of fluid from said chamber, a fluid supply conduit to supply readily flowable treating material to said chamber, check valve means associated with said fluid supply conduit to prevent flow of fluid material from said chamber through said fluid supply conduit, and means for suddenly and periodically applying pressures to said impact transmitter to periodically increase and decrease the pressures on the treating material in said chamber and to transmit through said treating material similar periodic forces over said resilient face when said face is disposed against the surface to be treated.

9. A device for treating concrete and masonry structures and the like to densify them in the region of their surfaces, which comprises a body portion, a diaphragm connected by peripheral portions to define a chamber of variable volume, and resilient means for maintaining the diaphragm and the body portion in spaced relation, said diaphragm being movable relative to said body portion, said body portion carrying a relatively flat, resilient member with a depressible contact face to be placed against the surface to be treated, a passageway through said body portion and said face to said chamber for the passage of fluid from said chamber, means for supplying readily flowable treating fluid to said chamber, and means for suddenly and periodically applying pressures to said diaphragm to periodically increase and decrease the pressures on the treating material in said chamber and to transmit through said treating material similar periodic forces over said resilient face when said face is disposed against the surface to be treated.

10. A device for treating the surfaces of masonry and concrete structures and the like, which comprises two spaced walls connected by peripheral portions to define a chamber, one wall being movable relative to the other, resilient means for maintaining said walls in spaced relation, a relatively flat, resilient face carried by one of said walls, impact transmitting means carried by the other of said walls, a passageway through said resilient face and its supporting wall for the passage of fluid from said chamber, means for supplying a readily flowable treating material to said chamber, and means for suddenly and periodically applying pressures to said transmitting means to periodically increase and decrease the pressure on the treating material in said chamber and to transmit through said material similar periodic forces over said resilient face when said face is disposed against the surface to be treated.

11. A device for treating the surfaces of masonry and concrete structures and the like, which comprises two spaced walls connected by peripheral portions to define a chamber, one wall being movable relative to the other, a relatively flat, resilient face carried by one of said walls, impact transmitting means carried by the other of said walls, a passageway through said resilient face and its supporting wall for the passage of fluid from said chamber, a fluid supply passageway carried by said impact transmitting means for supplying a readily flowable treating material to said chamber, check valve means in said passageway for preventing flow of fluid from said chamber, and means for suddenly and periodically applying pressures to said transmitting means to periodically increase and decrease the pressure on the treating material in said chamber and to transmit through said material similar periodic forces over said resilient face when said face is disposed against the surface to be treated.

LOUIS S. WERTZ.